United States Patent [19]
Grossman et al.

[11] Patent Number: 5,100,803
[45] Date of Patent: Mar. 31, 1992

[54] ON-LINE METHOD OF DETERMINING UTILIZATION FACTOR IN HG-196 PHOTOCHEMICAL SEPARATION PROCESS

[75] Inventors: Mark W. Grossman, Belmont; Philip E. Moskowitz, Peabody, both of Mass.

[73] Assignee: GTE Products Corporation, Danvers, Mass.

[21] Appl. No.: 323,733

[22] Filed: Mar. 15, 1989

[51] Int. Cl.$^5$ .................. B01D 59/34; B01J 1/10; C25C 1/00

[52] U.S. Cl. .................. 436/57; 436/55; 204/105 R; 204/157.21; 250/423 P; 250/423 R

[58] Field of Search .................. 436/55, 57, 804; 204/45.1, 105, 157; 250/423 P, 423 R

[56] References Cited

U.S. PATENT DOCUMENTS

| | | | |
|---|---|---|---|
| 3,897,331 | 7/1975 | Work | 313/485 |
| 3,983,019 | 9/1976 | Smith | 209/10 |
| 4,379,252 | 4/1983 | Botter nee Bergheaud | 204/157 R |
| 4,514,363 | 4/1985 | Durbin | 423/3 |
| 4,527,086 | 7/1985 | Maya | 313/485 |
| 4,648,951 | 3/1987 | Maya | 204/157.21 |
| 4,678,550 | 7/1987 | Grossman et al. | 204/105 R |
| 4,713,547 | 12/1987 | Grossman | 250/373 |

FOREIGN PATENT DOCUMENTS

| | | |
|---|---|---|
| 0280788 | 9/1988 | European Pat. Off. |
| 0281687 | 9/1988 | European Pat. Off. |

OTHER PUBLICATIONS

Webster amd Zare, J. Phys. Chem., 85:1302 (1981).
McDowell et al., Can. J. Chem., 37: 1432 (1959).
Gunning and Swartz, Adv. Photochem., 1:209 (1963).
Waymouth, Electric Discharge Lamps, MIT Press 1971.
Maya et al., Science, 226:435-436, (1984).

*Primary Examiner*—David L. Lacey
*Assistant Examiner*—Kimberly A. Trautman
*Attorney, Agent, or Firm*—Ernest V. Linek

[57] ABSTRACT

The present invention is directed to a method for determining the utilization factor [U] in a photochemical mercury enrichment process ($^{196}$Hg) by measuring relative $^{196}$Hg densities using absorption spectroscopy.

3 Claims, 3 Drawing Sheets

ON-LINE METHOD OF DETERMINING UTILIZATION FACTOR IN HG-196 PHOTOCHEMICAL SEPARATION PROCESS

STATEMENT OF GOVERNMENT INTEREST

The Government of the United States of America has rights in this invention pursuant to Subcontract 4540710 under Prime Contract DE-AC03-76SF00098 awarded by the Department of Energy.

FIELD OF THE INVENTION

The present invention is directed to a method and apparatus useful in the isotopic enrichment of a predetermined isotope of mercury (Hg) from a naturally occurring mercury mixture. While the present invention may be used in the enrichment of any one of the seven naturally occurring isotopes of mercury ($^{202}$Hg, $^{200}$Hg, $^{199}$Hg, $^{201}$Hg, $^{198}$Hg, $^{204}$Hg, and $^{196}$Hg,) it has particularly advantageous application in the photochemical enrichment of the $^{196}$Hg isotope, which has a natural abundance of only about 0.146 percent.

Photochemical mercury enrichment processes are well known and have been well documented in the literature. See for example, Webster and Zare, *J. Phys. Chem.*, 85: 1302 (1981); McDowell et al., *Can. J. Chem.*, 37: 1432 (1959); Gunning and Swartz, *Adv. Photochem.*, 1: 209 (1963) and U.S. Pat. Nos., 4,678,550, 4,648,951, and 4,514,363, the teachings of which are hereby incorporated herein by reference.

BACKGROUND OF THE INVENTION

Many devices utilize mercury in their operation, particularly in the field of electric lamps and lighting. Such devices include arc discharge lamps which typically employ mercury as one of the vaporizable components therein. See, for example, Waymouth, *Electric Discharge Lamps*, MIT Press 1971 for a description of the basic principles of such lamps.

In U.S. Pat. No. 4,379,252, (the '252 patent), the advantages of utilizing higher than normal levels of $^{196}$Hg in the Hg added to fluorescent lamps are described and include unexpectedly high efficiency gains in light output. The disclosure of this patent is hereby incorporated herein by reference.

The drawback of using this isotope lies in its high cost. For example, using conventional enrichment techniques, mercury which has been enhanced to contain about 35% of the $^{196}$Hg isotope can cost about $500 per milligram. While only sub-milligram quantities of this isotope need be added to a fluorescent lamp to afford beneficial results, economic realities always play a part in consumer products. Accordingly, it is easy to understand why more economical methods of obtaining this isotope continue to be sought.

Isotopically enriched mercury can be produced by a number of methods. One method involves photosensitized chemical reactions utilizing elemental mercury and various compounds. The compounds HCl and O$_2$ react with mercury atoms when the mercury atoms are excited by resonance radiation, in particular, 2537 Å radiation produced in a Hg ($^3P-^1S_o$) transition generating isotopically selective reactions. Thus, the Hg compound formed contains Hg enriched in a particular isotope, and the Hg must be separated from the compound into its liquid or free state i.e., elemental Hg)) in order to recover the isotopically enriched metal.

INFORMATION DISCLOSURE

The following documents are recited as general background information with respect to the subject matter of the present invention. To the extent deemed necessary by artisans of ordinary skill in the art to which this invention pertains, the teachings of these documents are hereby incorporated herein by reference.

Grossman, U.S. Pat. No. 4,713,547;
Grossman et al., U.S. Pat. No. 4,678,550;
Maya, U.S. Pat. No. 4,527,086;
Durbin, U.S. Pat. No. 4,514,363;
Work et al., U.S. Pat. No. 3,379,252;
Botter nee Bergheaud et al., U.S. Pat. No. 3,983,019;
Smith et al., U.S. Pat. No. 3,897,331;
Grossman et al., U.S. Ser. No. 815,150, filed Dec. 31, 1985;
European Patent Publication No. 0 281 687, published Sept. 14, 1988, claiming priority of U.S. Ser. No. 947,217, filed Dec. 29, 1986; and
European Patent Publication No. 0 280 788, published Sept. 7, 1988, claiming priority of U.S. Ser. No. 947,216, filed Dec. 29, 1986.

SUMMARY OF THE INVENTION

Measuring relative $^{196}$Hg density permits the determination of the utilization factor, U, in a photochemical $^{196}$Hg isotope enrichment process. It has been found that absorption spectroscopy is a convenient way of measuring this density.

Several equations are used in the present specification and the following definitions of terms used therein will enable the reader to readily comprehend these equations:

U utilization, sometimes specified as $U_{196}$, which refers particularly to $^{196}$Hg utilization. The term $U_o$ refers to the utilization measured at time ($t_o$);

E enrichment, sometimes specified as $E_{196}$, which refers particularly to $^{196}$Hg enrichment;

Y total product yield, sometimes specified as $Y_{196}$, which refers particularly to the total yield of $^{196}$Hg;

Q total feedstock flow rate, sometimes specified as $Q_{196}$, which refers particularly to the feedstock flow rate for $^{196}$Hg;

F effluent flow rate, sometimes specified as $F_{196}$, which refers particularly to the effluent flow rate for $^{196}$Hg;

N density, often specified as either an "upstream density" or $N_u$, or as a "downstream density" or $N_d$, each of which may further be defined as being measured when no U.V. radiation is present, as $N_{un}$ or $N_{dn}$, indicating that this density determination was made when no photochemical isotope separation was occurring. When the subscript "n" is missing, the density measurement was made while the U.V. lamp was "on", i.e., while photochemical isotope separation was occurring.

vA volumetric flow rate, often specified as either an "upstream volumetric flow rate" or $vA_u$, or as a "downstream volumetric flow rate" or $vA_d$, each of which may further be defined as being measured when no U.V. radiation is present, as $vA_{un}$ or $vA_{dn}$, indicating that this flow rate determination was made when no photochemical isotope separation was occurring. When the subscript "n" is missing, the volumetric flow rate measurement was made while the U.V. lamp was "on", i.e., while photochemical isotope separation was occurring.

DETAILED DESCRIPTION OF THE PREFERRED EMBODIMENTS

Figure 1:
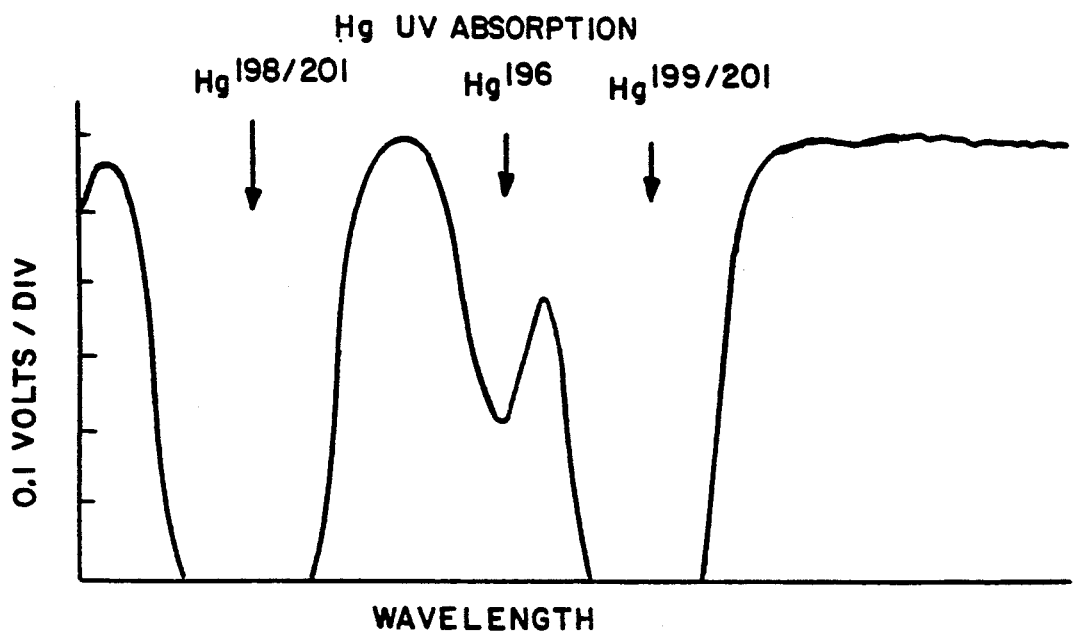
FIG. 1 illustrates an absorption spectrum showing the Hg and adjacent peaks.

For a batch model (quantities spatially averaged) the $^{196}$Hg utilization (U) and enrichment (E) factors may be defined as follows:

$$U_{196} = \frac{Y_{196}}{Q_{196}} \quad (1)$$

$$E_{196} = \frac{Y_{196}/Y}{Q_{196}/Q} \quad (2)$$

where Y and Q refer to the total product yield (total implies all isotopes) and total feedstock flowrate, respectively. Subscript $_{196}$ refers to the particular isotope, i.e., $^{196}$Hg.

In this model no loss of Hg occurs. If F represents the effluent flow rate then $$Q = Y + F \quad (3)$$

and $$Q_{196} = Y_{196} + F_{196} \quad (4)$$

The feedstock flowrate is usually well known since it can readily be determined as set forth in Grossman, U.S. Pat. No. 4,713,547, the disclosure of which is hereby incorporated herein by reference.

$$Q_{Hg} = Q_{gas} \frac{P_{Hg}}{P_{gas}}$$

In this equation, the subscript "gas" refers to the carrier gas. Occasionally problems arise in measuring $Q_{gas}$ or $P_{gas}$ or controlling $P_{Hg}$, so that some on-line monitoring of $Q_{Hg}$ is probably worthwhile but not as important as monitoring $U_{196}$, whose variability is not yet well controlled or understood.

$$U = \frac{Y_{196}}{Q_{196}} = \frac{Q_{196} - F_{196}}{Q_{196}} \quad (6)$$

The flows Q or F can be expressed as $$Q = N (vA) \quad (7)$$

where N represents a density and (vA) a volumetric flowrate. These are quantities spatially averaged over a suitable length scale.

Thus, it appears from equation (6) and (7) that only the upstream density and downstream density need to be measured to find U. However, as noted in equation (5), if $P_{gas}$ changes with $Q_{Hg}$ and $Q_{gas}$ fixed then $P_{Hg}$ or $N_{Hg}$ will vary. Due to the finite conductance of the system, a pressure drop and therefore $P_{Hg}$ decrease occurs along the system. Thus a measurement of upstream mercury density $N_u$ and downstream mercury density $N_d$ will show a decrease even with no photochemical isotope separation occurring. This effect must be corrected before one can properly measure U.

For no light conditions $$Q_{un} = N_{un} (vA)_{un} \quad (8)$$

$$Q_{dn} = N_{dn} (vA)_{dn} \quad (9)$$

and $Q_{un} = Q_{dn}$ (10)

Assume both $N_{un}$ and $N_{dn}$ are measured and designate the 196 density upstream and downstream with no U.V. radiation then $$\frac{(vA)_{un}}{(vA)_{dn}} = \frac{N_{dn}}{N_{un}} \quad (11)$$

We assume that the relative volumetric flow rates are independent of the photochemical reaction then $$\frac{1}{P} = \frac{N_{dn}}{N_{un}} = \frac{(vA)_u}{(vA)_d} \quad (12)$$

Note that P is just a relative total gas pressure value.

During processing:

$$Q_{196} = Q_u = N_u(vA)_u \quad (13)$$

$$F_{196} = Q_d = N_d(vA)_d \quad (14)$$

$$U = \frac{Q_{196} - F_{196}}{Q_{196}} = \frac{N_u(vA)_u - N_d(va)_d}{N_u(vA)_u} \quad (15)$$

$$= 1 - \frac{N_d(vA)_d}{N_u(vA)_u} \quad (16)$$

$$U = 1 - \frac{N_d}{N_u} \cdot P \quad (17)$$

From equations (17) and (12) it is seen that only relative measurements of density are needed.

A further simplification occurs if one assumes that $N_u$ is constant in time and independent of U.V. radiation. Then equation (17) becomes, using equation (12), new equation (18):

$$U = 1 - \frac{N_d}{N_{dn}} \quad (18)$$

and the $^{196}$Hg density needs to be measured at only one downstream location. As mentioned previously $N_u$ normally fulfills this condition.

Using a mass spectrometer the concentration of $^{196}$Hg in the effluent can be measured. Further details of this procedure may be found in the copending application commonly assigned entitled "Method and Apparatus to Measure Mercury Density in a Flow Reactor Used for Hg-196 Isotope Separation," by M. W. Grossman, R. Lagushenko and J. Maya, U.S. Ser. No. 07/323,641, now abandoned, filed Mar. 15, 1989. The disclosure of this application is hereby incorporated herein by reference.

This density implies $U_o$ which is related to U as follows:

$$U = U_o + (1 - U_o)\frac{Y}{Q} \quad (19)$$

Using the relationship that $$Y = \frac{QU}{E} \quad (20)$$

one finds $$E = \frac{1 - U_o}{1 - U_o/U} \quad (21)$$

and $$U = U_o/(1 - (1 - U_o)/E) \quad (22)$$

Thus measuring $U_o$ via mass spectrometry and $U$ via relative density measurement implies $E$. Furthermore knowing $Q$ then implies $Y$ and the process is completely specified.

Table I shows the results of several trials using equation 18 to calculate U.

TABLE I

| PASS 2 UTILIZATION MEASUREMENT VIA LAS Cell: A2 Width: 10 Max: J10 | | | | | | | |
|---|---|---|---|---|---|---|---|
| A<br>RUN ID | B<br>U | C<br>Uo | D<br>E | E<br>To + Tx<br>RUN TIME<br>(hr) | F<br>To<br>LAMP OFF<br>(hr) | G<br>Uo<br>CORRECTED | H<br>U-predict |
| 12/17/87 | .070 −+ .050 | 0.129 | 3.47 | 3 | 0.25 | 0.141 | 0.187 |
| 1/5/88 | .561 −+ .079 | 0.226 | 5.49 | 1.15 | 0.15 | 0.260 | 0.300 |
| 1/8/88 | .377 −+ .102 | 0.427 | 6.69 | 1.93 | 0.17 | 0.468 | 0.509 |
| 1/29/88 | .324 −+ .033 | 0.187 | 2.39 | 1.15 | 0.12 | 0.209 | 0.312 |
| 2/2/88 | .305 −+ .058 | 0.221 | 1.92 | 1.68 | 0.18 | 0.248 | 0.407 |

COMMENTS
U-predict = Uo/(1-(1-Uo)/E)
U = 1-Nd/Ndn
CORRECTION TO Uo
Uo = (To + Tx)/Tx*Uo A tuneable dye laser spectroscopy at 2537Å was used to obtain the densities $N_d$ and $N_{dn}$ in equation 18. An example of an absorption spectrum for showing the $^{196}$Hg and adjacent peaks is shown in FIG. 1. For each reactor run, two sets of data were recorded: one with the U.V. excitation source on and one off, together yielding the ratio $N_d/N_{dn}$.

$U_o$ and E are measured via mass spectroscopy in a batch mode. $U_o$ corrected represents taking into account the effect of turning the photochemical lamp off on the measurement of $U_o$. In this case feedstock mercury is collected with previously trapped effluent mercury for a time $t_o$. The predicted U is given by equation (22) assuming E is measured.

Figure 2:
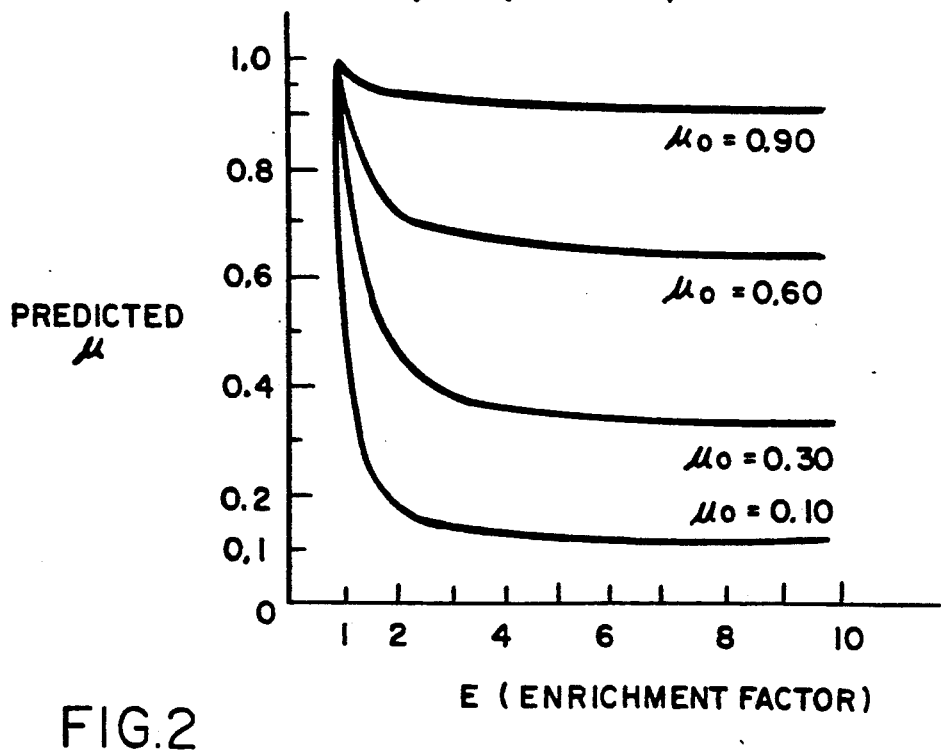
FIG. 2 is a graph representing the variation of the predicted U versus E and $U_o$.

FIG. 2 shows the variation of the predicted U versus E and $U_o$. For E=2 the predicted U is very sensitive to errors in E and $U_o$. For E>2, U is close to $U_o$ and nearly independent of E.

Figure 3:
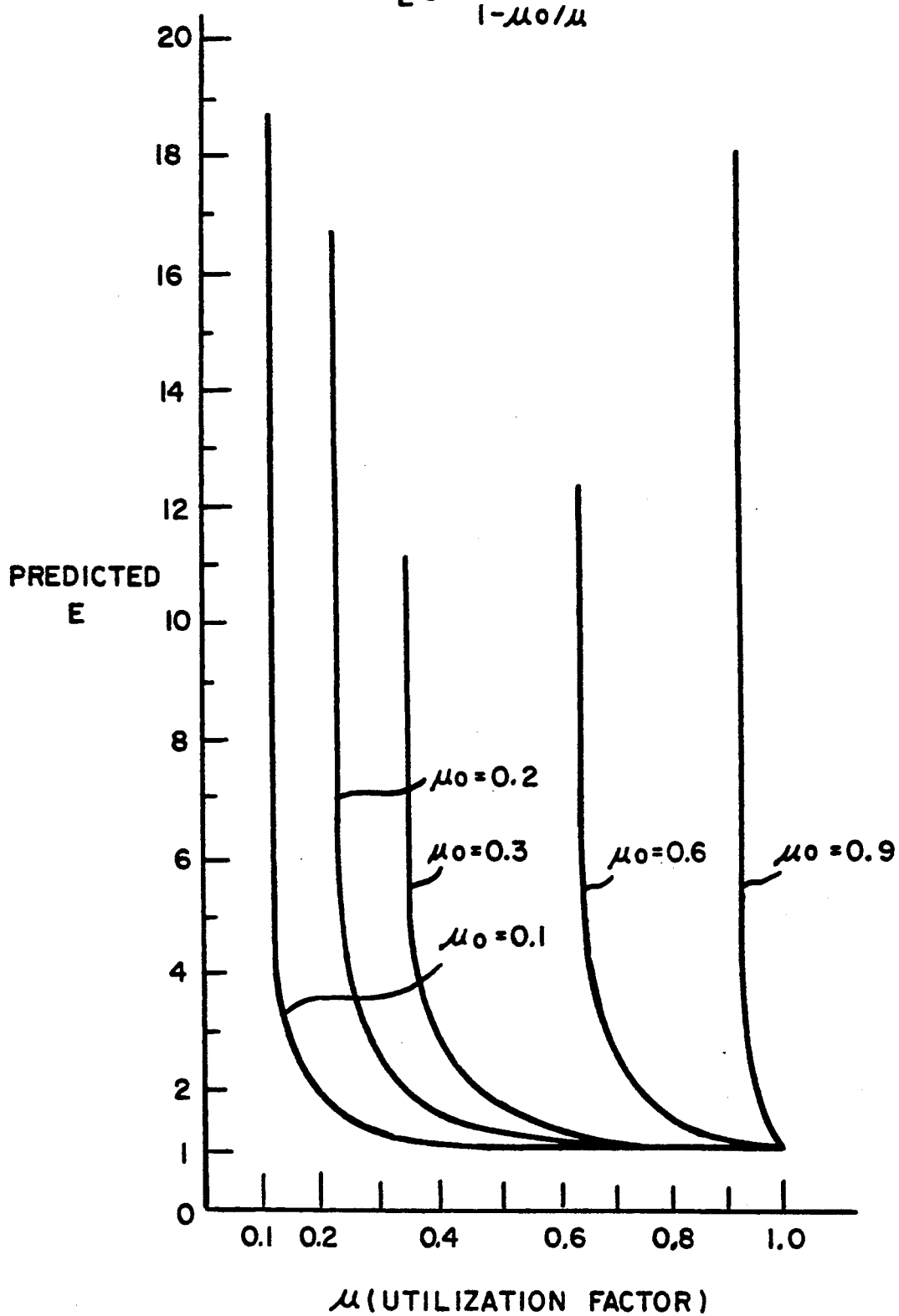
FIG. 3 is a graph representing the variation of E versus U and $U_o$.

FIG. 3 shows the variation of E versus U and $U_o$ as described in equation (21). For E>2, E is sensitive to changes in U. An accurate measurements of U and $U_o$ are needed to measure E utilizing equation (21).

All of the standard elements of the reactor system, i.e., the lamp, the filter, and the reactor vessel are formed of a material which is transparent to the desired excitation radiation, particularly 253.7 nm (2537 Å) for $^{196}$Hg. One preferred material is quartz. While the lamp used in the reactor of the present invention may be any low pressure (e.g., about 2.5 Torr) electric discharge type lamp which transmits radiation of about 253.7 nm, those using microwave cavities for the excitation are preferred.

An especially preferred lamp comprises an electroded mercury-inert gas lamp. At least two electrodes are positioned and sealed at each end of a sealed lamp envelope which contains mercury vapor and one or more inert gases. The sealed lamp envelope is surrounded at least in part by an elongated tube which defines a region for controlling a heat exchange medium which controls the temperature of the inner, sealed lamp envelope.

In one embodiment, uniform temperature is created in the Hg lamp by circulating H$_2$O at a predetermined temperature about an isolated section of the lamp. Other fluids, or inert gases such as argon, helium, xenon and neon, can be selected depending on their boiling point behavior to provide the desired uniform temperature of the inner discharge envelope.

The circulating heat transfer medium also prevents the formation of O$_3$ (ozone) by purging O$_2$ in the vicinity of the lamp. Ozone is created when O$_2$ is exposed to 185 nm radiation which may be emitted by the lamp. Ozone, in turn, absorbs various wavelengths of radiation emitted from the lamp. This is undesirable because radiation having a wavelength of 253.7 nm, useful for the photochemical separation of $^{196}$Hg, is absorbed of O$_3$. Thus, in a preferred embodiment, a fluid or inert gas is circulated about the entire exterior of the lamp envelope, thereby purging all of the O$_2$ from the immediate vicinity of the envelope. This allows for a greater emission intensity of the particular, desired radiation from the lamp envelope.

In a preferred embodiment, the outer lamp jacket comprises a quartz cylinder. This outer jacket serves several purposes. First, it allows for the use of a gas purge, if desired, for eliminating O$_2$ about the transmission section, thereby reducing O$_3$ formation. Second, if the outer jacket is designed to be demountable, it permits the interchange of different inner lamp envelopes. This makes possible the isolation of different Hg isotopic distributions using the same outer jacket. Also, lamp envelopes having different diameters can be used to affect the emitted linewidth of radiation.

The fact that the outer tube can be demountable allows for the use of outer tubes of different types of materials which can selectively filter certain emitted wavelengths. For example, by changing the outer tube material to Vycor 7910, it is possible to filter wavelengths below 200 nm thereby eliminating ozone formation in the region surrounding the lamp.

Figure 4:
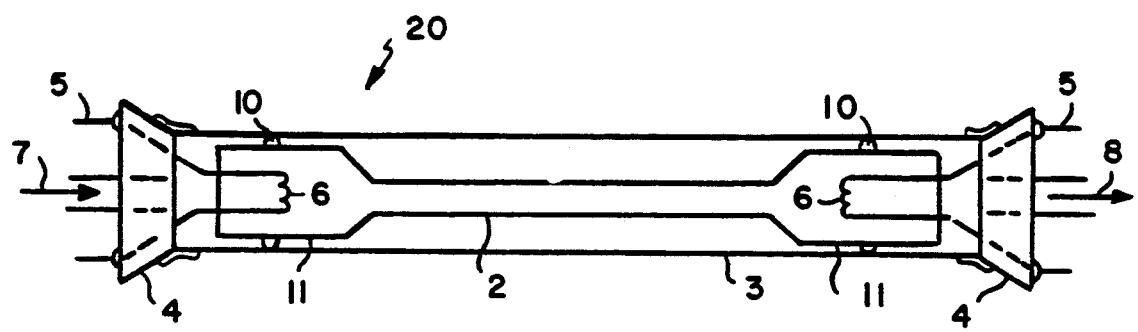
FIG. 4 illustrates one preferred monoisotopic lamp used in the process of the present invention.

FIG. 4 illustrates the preferred lamp which is used in the process of this invention.

The mercury lamp 20 of FIG. 4 comprises an inner lamp envelope 2 and an outer jacket 3. In the preferred embodiment, both the envelope 2 and the outer jacket are constructed of quartz. The envelope 2 can be of various diameters depending on the desired optical depth. A larger diameter provides greater power density and broader bandwidth. For the isotopic separation of $^{196}$Hg, the inner diameter of the envelope is typically about 10 nm. The envelope 2 typically contains a source of Hg such as elemental Hg as well as an inert gas such as argon. However, any inert gas which is compatible with Hg vapor can be used. Typically, between about 1 and 2 mg of Hg is contained within lamp envelopes which have an inner diameter of about 10 mm. The length of the lamp can be from about 30–150 cm with a preferred length of about 40 cm.

A tapered stopper 4, typically of an elastomeric material, is disposed at each distal end of the outer jacket 3 and serves to substantially center the outer jacket around at least one section of the envelope 2. Furthermore, the tapered stopper guides and positions an electrode lead 5 through both the stopper and the outer jacket, and into the envelope where it provides current for the electrodes 6. In the preferred embodiment, the electrodes are shaped as coils and able to withstand a current of at least about 5 amperes. The tapered stoppers also contain openings in their centers which provide for an inlet 7 and outlet 8 stream of circulating heat transfer medium which is preferably water. The heat transfer medium circulates about at least one portion or the inner discharge envelope 2. The heat transfer medium then exits the lamp at outlet 8 contained in the outer jacket. Tubes, 11, preferably comprising a heat resistant glass are connected to each end of the envelope to provide regions to contain the electrodes and to further provide regions for mounting the envelope within the jacket. These tubes 11 are preferably separated from the outer tube with spacers 10 preferably comprising elastomeric materials. It is pointed out that the spacers 11 must have openings which allow the heat transfer medium to travel through the lamp.

The temperature of the inner envelope 2 is controlled by the temperature of the circulating heat transfer medium. As the temperature of the heat transfer medium is increased or decreased, the corresponding temperature of the inner envelope also increases or decreases. The linewidth of the emitted radiation is typically affected greatly by temperatures between 15° C., and 50° C. The emission intensity depends strongly on the temperature of the inner envelope.

The entire lamp assembly can be placed within a mercury vapor filter. In one preferred embodiment, the filter comprises a hollow, axial elongated torus containing mercury vapor and an inert gas. This structure can be formed by the combination of two tubes, preferably quartz, where an inner tube is inserted into an outer tube and the tubes are sealed at both ends. This encloses a medium which can be made to contain a gaseous Hg vapor medium which transmits wavelengths of light desirable for the photochemical separation of $^{196}$Hg or specific isotopes of Hg.

In a preferred embodiment of this invention $^{196}$Hg is produced by enriching mercury compounds using radiation with a wavelength of 253.7 nm. The control of the specific wavelength is very dependent upon the vapor equilibrium temperature within the lamp envelope, which depends, in turn, upon the lowest temperature within the envelope. The vapor pressure of Hg within the envelope (for useful mercury isotope separation) and the intensity of the emitted radiation are proportional with a variation of about 10–15%.

If the intensity of radiation emitted from the lamp increases, the corresponding linewidth of the emitted radiation also increases. This causes other isotopes of mercury to become excited. Such an effect is undesirable, as it leads to a separation which yields a product having lower isotopic specificity. Thus, it is important to control the vapor pressure of the lamps to ensure that radiation of the proper linewidth is emitted. For a further explanation of the relationship between lamp temperature, radiation intensity and linewidth of the radiation see Maya et al., *Science, 226:* 435–436 (1984), the teachings of which are incorporated herein by reference.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. A method for determining the utilization factor [U] in a photochemical mercury enrichment process ($^{196}$Hg) which comprises measuring the relative $^{196}$Hg yield and flow rate by means of absorption spectroscopy and calculating U according to the following formula:

$$U_{196} = \frac{Y_{196}}{Q_{196}}$$

where Y and Q refer, to the $^{196}$Hg product yield and $^{196}$Hg feedstock flow rate, respectively.

2. A method for determining the utilization factor [U] in a photochemical mercury enrichment process ($^{196}$Hg) which comprises measuring the relative $^{196}$Hg densities by means of absorption spectroscopy and calculating U according to the following formula:

$$U = \frac{Y_{196}}{Q_{196}} = \frac{Q_{196} - F_{196}}{Q_{196}}$$

wherein Q and F are flow rates defined as follows:

$$Q_{196} = Q_u = N_u(vA)_u \text{ and}$$

$$F_{196} = Q_d = N_d(vA)_d$$

where N is density, vA is volumetric flow rate and so specifies upstream while it specifies downstream.

3. A method for determining the utilization factor [U] in a photochemical mercury enrichment process ($^{196}$Hg) which comprises measuring the relative $^{196}$Hg density by means of absorption spectroscopy and calculating U according to the following formula:

$$U = 1 - \frac{N_d}{N_{dn}}$$

wherein $N_d$ is the downstream $^{196}$Hg density and $N_{dn}$ is the downstream $^{196}$Hg density with no U.V. radiation present.

* * * * *